(12) United States Patent
Sadeh et al.

(10) Patent No.: US 9,398,625 B2
(45) Date of Patent: Jul. 19, 2016

(54) TRIGGERING A SIGNALING EVENT FROM THE DATA PLANE

(71) Applicant: Vasona Networks Inc., Santa Clara, CA (US)

(72) Inventors: Oren Sadeh, Tel Aviv (IL); Ofer Weill, Modiin (IL); Vijay Devarapalli, Los Altos, CA (US)

(73) Assignee: VASONA NETWORKS INC., San Jose, CA (US)

( * ) Notice: Subject to any disclaimer, the term of this patent is extended or adjusted under 35 U.S.C. 154(b) by 190 days.

(21) Appl. No.: 13/895,623

(22) Filed: May 16, 2013

(65) Prior Publication Data

US 2014/0341047 A1   Nov. 20, 2014

(51) Int. Cl.
  *H04J 1/16*   (2006.01)
  *H04W 76/02*   (2009.01)
  *H04L 12/24*   (2006.01)
  *H04W 68/00*   (2009.01)
  *H04W 24/00*   (2009.01)

(52) U.S. Cl.
  CPC ......... *H04W 76/021* (2013.01); *H04L 41/0681* (2013.01); *H04L 41/06* (2013.01); *H04W 24/00* (2013.01); *H04W 68/00* (2013.01)

(58) Field of Classification Search
  CPC ... H04L 41/06; H04L 41/0681; H04W 68/00; H04W 76/021; H04W 24/00
  USPC ................................................. 370/242, 252
  See application file for complete search history.

(56) References Cited

U.S. PATENT DOCUMENTS

| 6,775,258 B1 * | 8/2004 | van Valkenburg ...... H04L 45/00 370/338 |
| 2003/0081607 A1 | 5/2003 | Kavanagh |
| 2010/0103935 A1 | 4/2010 | Sairanen |
| 2012/0087260 A1 * | 4/2012 | Devarapalli et al. .......... 370/252 |
| 2014/0019581 A1 * | 1/2014 | Baillargeon et al. .......... 709/217 |

FOREIGN PATENT DOCUMENTS

WO   2012152147 A1   11/2012

OTHER PUBLICATIONS

3GPP TS 23.007, "3rd Generation Partnership Project; Technical Specification Group Core Network and Terminals; Restoration procedures (Release 11)", 67 pages, V11.3.0, Sep. 2012.

(Continued)

*Primary Examiner* — Peter Cheng
(74) *Attorney, Agent, or Firm* — D.Kligler IP Services Ltd.

(57) ABSTRACT

Some examples of triggering a signaling event in a control plane of a mobile network from a user plane of the mobile network. After it is determined in accordance with a predefined criterion that an error indication should be sent, an error indication may be sent in the user plane, from a location external to a radio access network of the mobile network and external to a core network of the mobile network, to at least one element in the radio access network or the core network, thereby triggering a signaling event. The predefined criterion may include no accessible association between a user identifier or cell identifier and an identifier of a tunnel for tunneling user data packets between the radio access network and the core network. The lack of an accessible association may have negative implications, e.g. for traffic management. The triggered signaling event may include releasing this tunnel.

22 Claims, 6 Drawing Sheets

(56) References Cited

OTHER PUBLICATIONS

3GPP TS 29.281, "3rd Generation Partnership Project; Technical Specification Group Core Network and Terminals; General Packet Radio System (GPRS) Tunnelling Protocol User Plane (GTPv1-U) (Release 11)", 27 pages, V11.4.0, Sep. 2012.

3GPP TS 29.060, "3rd Generation Partnership Project; Technical Specification Group Core Network and Terminals; General Packet Radio Service (GPRS); GPRS Tunnelling Protocol (GTP) across the Gn and Gp interface (Release 11)", 174 pages, V11.4.0, Sep. 2012.

3GPP TS 29.274, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 11)", 219 pages, V11.4.0, Sep. 2012.

3GPP TS 36.413 V10.3.0 (Sep. 2011) 3rd Generation Partnership Project; Technical Specification Group Radio Access Network; Evolved Universal Terrestrial Radio Access Network (E-UTRAN); S1 Application Protocol (S1AP) (Release 10), 254 pages, V10.3.0, Sep. 2011.

3GPP TS 25.413, "3rd Generation Partnership Project; Technical Specification Group Radio Access Network; UTRAN Iu interface Radio Access Network Application Part (RANAP) signalling (Release 10)", 427 pages, V10.3.0, Sep. 2011.

3GPP TS 23.060, "3rd Generation Partnership Project; Technical SpecificationGroup Services and System Aspects; General Packet Radio Service (GPRS); Service Description; Stage 2 (Release 6)", 212 pages, V6.11.0, May 2012.

3GPP TS 23.401, "3rd Generation Partnership Project; Technical Specification Group Services and System Aspects; General Packet Radio Service (GPRS) enhancements for Evolved Universal Terrestrial Radio Access Network (E-UTRAN) access (Release 8)", 167 pages, V8.0.0, Jul. 2012.

GPRS Tunneling Protocol (GTP) in LTE, 6 pages, Mar. 17, 2013 http://4g-lte-world.blogspot.co.il/2013/03/gprs-tunneling-protocol-gtp-in-lte.html.

LTD University, "Bearer Building and Tunnel Timing", Expert Opinion, Jan. 30, 2012 http://lteuniversity.com/get_trained/expert_opinion1/b/donhanley/archive/2012/01/30/bearer-building-and-tunnel-timing.aspx.

Ali, I., "LTE & EPC Architecture; LTE Attach Procedure", Version 3.0, 25 pages, Mar. 2013.

GPRS Tunnelling Protocol, Wikipedia, Mar. 3, 2012 http://en.wikipedia.org/wiki/GPRS_Tunnelling_Protocol.

International Application PCT/IL2013/050919 Search Report dated Feb. 19, 2014.

\* cited by examiner

TRIGGERING A SIGNALING EVENT FROM THE DATA PLANE

TECHNICAL FIELD

The disclosure relates to mobile networks.

BACKGROUND

A mobile network may be used to provide mobile data services to a user (also referred to as a subscriber). Data may be transmitted between a user equipment (UE) associated with a user and a packet data network (PDN).

The General Packet Radio Service (GPRS) Tunneling Protocol (GTP) is an IP-based protocol currently used in Global System for Mobile Communications (GSM), Universal Mobile Telecommunications System (UMTS), or (Long Term Evolution) LTE mobile networks. The GTP protocol includes a General Packet Radio Service Tunneling Protocol User Plane referred to as GTP-U for user data packets tunneled, for example, within the core network, within the radio access network, or between the radio access network and the core network. The tunneled user data packets may be packets in one or more formats such as Internet Protocol Version 4 (IPv4), Internet Protocol Version 6 (IPv6), or Point to Point Protocol (PPP). In order to negotiate a tunnel conforming to the GTP-U protocol between a given pair of tunnel endpoints, one or more signaling protocols may be used such as GTP Version 1 Control (GTPv1-C), GTP Version 2 Control (GTPv2-C), Radio Access Network Application Part (RANAP), or S1 Application Protocol (S1-AP).

SUMMARY

In accordance with the presently disclosed subject matter, there is provided a signaling event triggering system, comprising: a determiner configured to determine in accordance with a predefined criterion that an error indication should be sent; and an error indication sender, external to a radio access network of a mobile network and to a core network of the mobile network but operatively connected to at least one element in any of the radio access network or core network, the sender configured, responsive to a notification from the determiner, to send an error indication in a user plane of the mobile network to at least one of the at least one operatively connected element, thereby triggering a signaling event in a control plane of the mobile network.

In some examples of the system, the determiner includes: a header inspector configured to inspect a General Packet Radio System Tunneling Protocol User Plane header to determine a tunnel identifier; and a checker configured to check an association data structure for an association between the tunnel identifier and a user identifier or cell identifier; wherein the predefined criterion includes the checked for association not being accessible in the association data structure. In some cases of these examples, the tunnel identifier includes at least one General Packet Radio System Protocol Tunnel Endpoint Identifier.

In some examples of the system, the determiner includes: a receiver configured to receive a tunnel identifier or an indication that an association between a tunnel identifier and a user identifier or cell identifier is not accessible.

In some examples of the system, the error indication is formulated in accordance with a General Packet Radio System Tunneling Protocol User Plane.

In some examples of the system, the error indication includes a tunnel identifier.

In some examples of the system, the signaling event includes release of a tunnel.

In some examples of the system, the signaling event includes establishment of a tunnel.

In some examples, the system further comprises: a signaling inspector configured to inspect signaling and to determine based on the inspected signaling, an association between a tunnel identifier and a cell identifier or user identifier.

In some examples of the system, at least one of the at least one operatively connected element is selected from a group comprising: Radio Network Controller, Serving General Packet Radio Service Node, Gateway General Packet Radio Service Support Node, eNodeB, NodeB, Base Station Controller, and Serving Gateway.

In accordance with the presently disclosed subject matter, there is provided a method, comprising: determining, in accordance with a predefined criterion, that an error indication should be sent; and subsequently, sending an error indication in a user plane of a mobile network, from a location external to a radio access network of the mobile network and external to a core network of the mobile network, to at least one element in the radio access network or the core network, thereby triggering a signaling event in a control plane of the mobile network.

In some examples of the method, the determining includes: inspecting a General Packet Radio System Tunneling Protocol User Plane header to determine a tunnel identifier; and checking for an association between the tunnel identifier and a user identifier or cell identifier; wherein the predefined criterion includes the checked for association not being accessible.

In some examples of the method, the signaling event includes release of a tunnel.

In some examples, the method further comprises: inspecting signaling; and determining based on the inspected signaling, an association between a tunnel identifier and a cell identifier or user identifier.

In some examples of the method, the error indication is formulated in accordance with a General Packet Radio System Tunneling Protocol User Plane.

In accordance with the presently disclosed subject matter, there is provided a computer program product comprising a computer readable medium having computer readable program code embodied therein, the computer program product, comprising: computer readable code for causing a computer to determine in accordance with a predefined criterion that an error indication should be sent; and computer readable code for causing the computer to subsequently send an error indication in a user plane of a mobile network, from a location external to a radio access network of the mobile network and external to a core network of the mobile network, to at least one element in the radio access network or the core network, thereby triggering a signaling event in a control plane of the mobile network.

In some examples of the computer program product, the computer readable code for causing the computer to determine includes: computer readable program code for causing the computer to inspect a General Packet Radio System Tunneling Protocol User Plane header to determine a tunnel identifier; and computer readable program code for causing the computer to check for an association between the tunnel identifier and a user identifier or cell identifier; wherein the predefined criterion includes the checked for association not being accessible.

In some examples of the computer program product, the signaling event includes release of a tunnel.

In some examples, the computer program product further comprises: computer readable program code for causing the computer to inspect signaling; and computer readable program code for causing the computer to determine based on the inspected signaling, an association between a tunnel identifier and a cell identifier or user identifier.

In some examples of the computer program product, the error indication is formulated in accordance with a General Packet Radio System Tunneling Protocol User Plane.

BRIEF DESCRIPTION OF THE DRAWINGS

In order to understand the subject matter and to see how it may be carried out in practice, some examples will be described, with reference to the accompanying drawings, in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate identical or analogous elements.

DETAILED DESCRIPTION OF THE DRAWINGS

Disclosed herein are some examples of triggering a signaling event in a control plane of a mobile network from a user plane (also referred to as a data plane) of the mobile network. After it is determined in accordance with a predefined criterion that an error indication should be sent, an error indication may be sent in the user plane, from a location external to a radio access network of the mobile network and external to a core network of the mobile network, to at least one element in the radio access network or the core network, thereby triggering a signaling event. The predefined criterion may include no accessible association between a user identifier or cell identifier and an identifier of a tunnel for tunneling user data packets between the radio access network and the core network. The lack of an accessible association may have negative implications, e.g. for traffic management. The triggered signaling event may include releasing this tunnel.

In the description herein, numerous specific details are set forth in order to provide a thorough understanding of the subject matter. However, it will be understood by those skilled in the art that some examples of the subject matter may be practiced without these specific details. In other instances, well-known features, structures, characteristics, stages, methods, modules, elements, entities or systems have not been described in detail so as not to obscure the subject matter.

Usage of the term "typically although not necessarily", "although not necessarily so" "such as", "e.g.", "possibly", "it is possible", "optionally", "say", "for example," "for instance", "an example" "one example", "illustrated example", "some examples", "another example", "other examples, "various examples", "one instance", "some instances", "another instance", "other instances", "one case", "some cases", "another case", "other cases" or variants thereof means that a particular described feature, structure, characteristic, stage, method, module, element, entity, or system is included in at least one example of the subject matter, but not necessarily in all examples. The appearance of the same term does not necessarily refer to the same example(s).

The term "illustrated example", is used to direct the attention of the reader to one or more of the figures, but should not be construed as necessarily favoring any example over any other.

Usage of conditional language, such as "may", "can", "could", or variants thereof should be construed as conveying that one or more examples of the subject matter may include, while one or more other examples of the subject matter may not necessarily include, certain features, structures, stages, methods, modules, elements, entities or systems. Thus such conditional language is not generally intended to imply that a particular described feature, structure, stage, method, module, element, entity or system is necessarily included in all examples of the subject matter.

Usage of the term "or" should be construed to mean "and/or" unless expressly indicated otherwise, or unless incorrect in a particular context.

The term "non-transitory" is used to exclude transitory, propagating signals, but to otherwise include any volatile or non-volatile computer memory technology suitable to the application.

It should be appreciated that certain features, structures, characteristics, stages, methods, modules, elements, entities or systems disclosed herein, which are, for clarity, described in the context of separate examples, may also be provided in combination in a single example. Conversely, various features, structures, characteristics, stages, methods, modules, elements, entities or systems disclosed herein, which are, for brevity, described in the context of a single example, may also be provided separately or in any suitable sub-combination.

Usage of terms such as "deleting", "creating", "setting up", "establishing", "releasing", "modifying", "changing", "sending", "accessing", "determining", "checking", "assigning", "inspecting", "updating", "receiving", "notifying", "triggering", "formulating", "removing", "deleting", "negotiating", "tunneling", "signaling", "performing", "executing", "implementing", "transporting", "transmitting", "carrying" or the like, may refer to the action(s) or process(es) of a signaling event triggering system such as described below, a part thereof, another entity, or a part thereof.

The description herein refers to certain specifications which are hereby incorporated by reference herein. However, the subject matter is not bound by these specifications and it should be understood that the subject matter may cover any past, current or future specification which may be relevant to any example of triggering a signaling event from a data plane.

Figure 1:
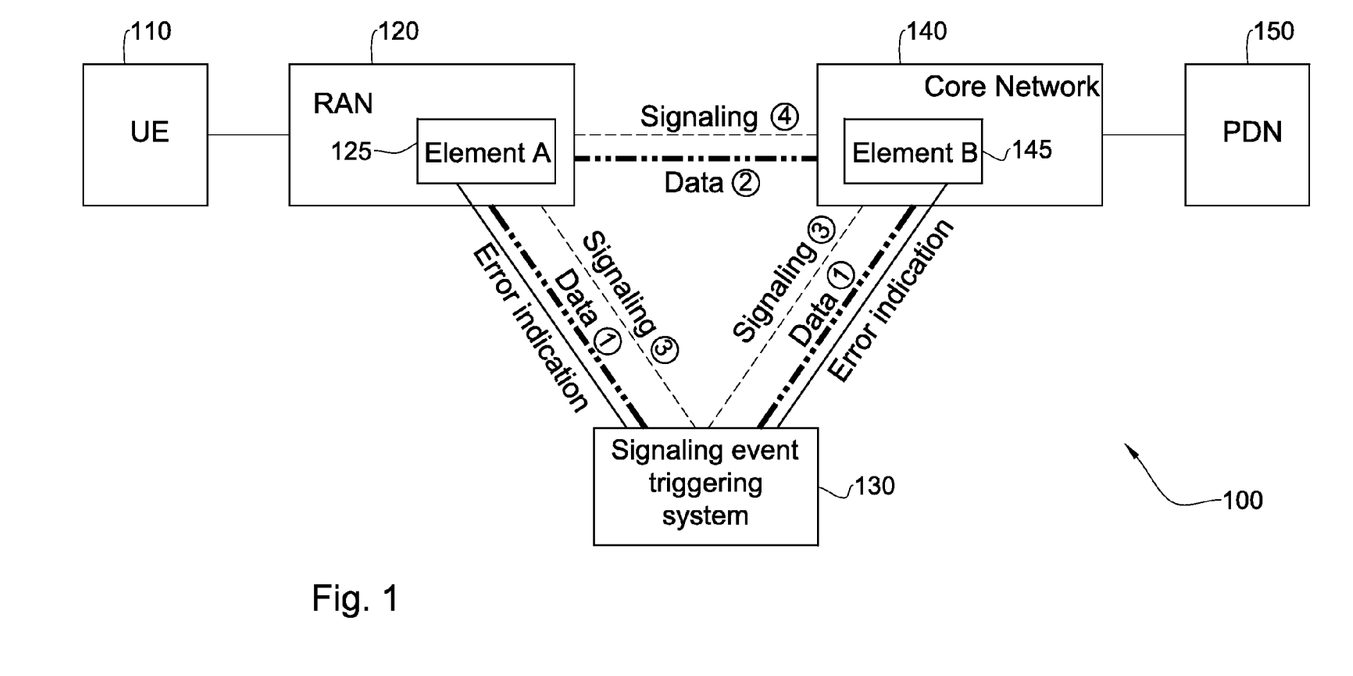
FIG. 1 is a block diagram of an example of a mobile network, in accordance with the presently disclosed subject matter.

Referring now to the figures in more detail, FIG. 1 is a block diagram of an example of a mobile network 100, in accordance with the presently disclosed subject matter.

In the illustrated example, mobile network 100 may include one or more user equipment(s) (UE) 110, a radio access network (RAN) 120, one or more signaling event triggering system(s) 130, a core network 140 and a packet data network (PDN) 150. For simplicity's sake, only one system 130 is illustrated in FIG. 1 and described herein, but in examples where mobile network 100 includes a plurality of systems 130, similar methods, systems and computer program products to those described herein may be applied, mutatis mutandis. Included in radio access network 120 and in core network 140 are one or more element(s) A 125 and one or more element(s) B 145, respectively, configured for instance to send or receive data as will be described in more detail below. At least part of signaling event triggering system 130 may be external to radio access network 120 and to core network 140 but operatively connected to at least one element in any of radio access network 120 or core network 140. For instance, at least part of signaling event triggering system 130 may be operatively connected to one or more of element(s) A 125 and signaling event triggering system 130 may therefore be configured to send an error indication in the data plane to any of the operatively connected element(s) A 125, as appropriate. Additionally or alternatively, for instance at least part of signaling event triggering system 130 may be operatively connected to one or more of element(s) B 145 and signaling event triggering system 130 may therefore be configured to send an error indication in the data plane to any of the operatively connected element(s) B 145, as appropriate. Depending on the example, at least part of signaling event triggering system 130 may or may not be in a location where accessing data between radio access network 120 and core network 140 is possible, and therefore two alternatives for data are shown in FIG. 1 where in the first alternative at least part of system 130 is in an accessible location (broken lines labeled 1) and in the second alternative system 130 not in an accessible location (broken lines labeled 2). Depending on the example, at least part of signaling event triggering system 130 may or may not be in a location where accessing signaling (in a control plane) between radio access network 120 and core network 140 is possible, and therefore two alternatives for signaling are shown in FIG. 1 where in the first alternative at least part of system 130 is in an accessible location (broken lines labeled 3) and in the second alternative system 130 is not in an accessible location (broken lines labeled 4), Depending on the example, part of system 130 may or may not be internal to any of radio access network 120 or core network 140. For simplicity's sake, only one user equipment element 110, element A 125 and element B 145 are illustrated in FIG. 1 and described herein per example, but in examples with a plurality of elements of one or more types, similar methods, systems and computer program products to those described herein may be applied, mutatis mutandis.

User equipment may be any user equipment configured to access PDN 150 via radio access network 120 and core network 130. Examples of user equipment 110 may include a Smartphone, feature phone, a tablet computer, a personal computer connecting to radio access network 120 via a USB dongle, etc.

Radio access network 120 may be any radio access network configured to connect between user equipment 110 and mobile network 120. Examples of radio access network 120 may include a GSM Evolution Radio Access Network (GERAN), Universal Terrestrial Radio Access Network (UTRAN), Evolved Universal Terrestrial Radio Access Network (E-UTRAN), etc. For instance, a radio access network 120 may include one or more of any of the following: base station(s), NodeB(s), base transceiver station(s), radio base station(s), eNodeB(s), Base Station Controller(s) (BSC), Radio Network Controller(s) (RNC), etc. An example of element A 125 may include a BSC, RNC, eNodeB, NodeB, etc.

Core network 140 may be any core network. Core network 140 includes a data network and optionally a voice network. Examples of core network 140 may include General Packet Radio Service (GPRS), Universal Mobile Telecommunications System (UMTS), Long Term Evolution (LTE), Code Division Multiple Access 2000 (CDMA2000), any network of any appropriate generation, etc. For instance, core network 140 may include one or more of any of the following: mobile switching center(s) (MSC), Home Location Registrar(s) (HLR), Policy and charging rules function(s) (PCRF), Charging Gateway Function(s) (CGF), Online Charging System(s) (OCS), Authentication, Authorization, and Accounting (AAA) server(s), mobility management entity/(ies) (MME), Home Subscriber Server(s) (HSS), PDN Gateway(s) (PGW), Serving General Packet Radio Service Node(s) (SGSN), Serving Gateway(s) (SGW), Gateway General Packet Radio Service Support Node (s)(GGSN) Evolved Packet Data Gateway(s) (ePDG), etc. An example of element B 145 may include an SGSN, an SGW, a GGSN, etc.

PDN 150 may be any packet data network. For example PDN 150 may be the Internet, or any other public or private packet data network.

In accordance with a GTP-U protocol, in order for user data packets to move between UE 110 and PDN 150, a tunnel (also referred to as a bearer) may be established between element A 125 of radio access network 120 and element B 145 of core network 140 for tunneling user data packets between (element A 125 of) radio access network 120 and (element B 145 of) core network 140. This tunnel may correspond to a radio access bearer (RAB) or E-UTRAN radio access bearer (E-RAB) between UE 110 and element A 125. Although any tunnel between any two elements may in some examples comprise in actuality a pair of one way tunnels rather than being a two way tunnel, for simplicity of description, a tunnel will be referred to in the single form as if a two way tunnel. It is possible that more than one tunnel may be active concurrently between element A 125 and element B 145 for the same UE 110, however for simplicity's sake the description will relate to a single tunnel per example. It is possible that more than one RAB or E-RAB may be active concurrently between UE element 110 and element A 125, however for simplicity's sake the description will relate to a single RAB or E-RAB per example. Optionally, in addition to or instead of a tunnel between element A 125 and element B 145, one or more other tunnel(s) in accordance with the GTP-U protocol, may be established within core network 140, within radio access network 120, or between radio access network 120 and core network 140, for tunneling user data packets destined for UE 110 or PDN 150. Depending on the example, any such tunnel may or may not correspond to the tunnel, if any, between element A 125 and element B 145.

Figure 2:
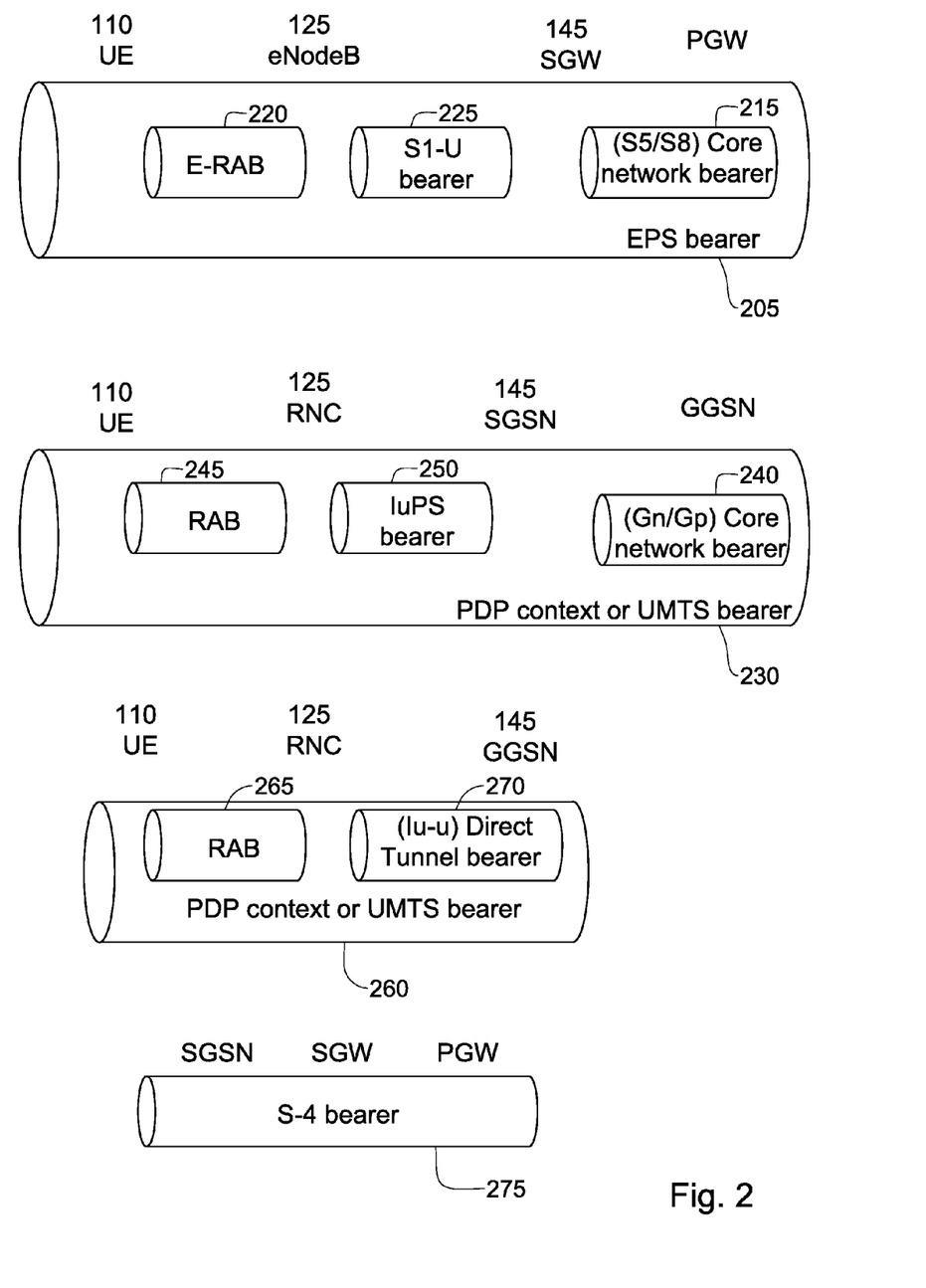
FIG. 2 illustrates various examples of bearers for tunneling user data packets between a user equipment and a packet data network, in accordance with the presently disclosed subject matter.

Refer now to FIG. 2, which illustrates various examples of bearers for tunneling user data packets between UE 110 and PDN 150, in accordance with the presently disclosed subject matter.

In an illustrated example, assuming that element A 125 of FIG. 1 is an eNodeB and element B 145 of FIG. 1 is an SGW, an Evolved Packet System (EPS) bearer 205 between a PGW in core network 140 and UE 110 may include an E-RAB 220 between UE 110 and eNodeB 125, an S1-U bearer 225 between eNodeB 125 and SGW 145 (the latter an example of a tunnel between elements A 125 and B 145), and a (core network) S5 or S8 bearer 215 between SGW 145 and the PGW. Alternatively, there may be no bearer but just IP connectivity between SGW 145 and the PGW. In this example, the GTP-U protocol may be relevant, for instance, for S1-U bearer 225, or S5/S8 bearer 215.

In an illustrated example, assuming that element A 125 of FIG. 1 is an RNC, and element B 145 of FIG. 1 is an SGSN, a Packet Data Protocol (PDP) context or UMTS bearer 230 between UE 110 and a GGSN in core network 140 may comprise an RAB 245 between UE 110 and RNC 125, an IuPS bearer 250 between RNC 125 and SGSN 145 (the latter an example of a tunnel between elements A 125 and B 145) and a core network bearer (Gn/Gp) 240 between SGSN 145 and the GGSN. In this example, the GTP-U protocol may be relevant, for instance, for IuPS bearer 250, or Gn/Gp bearer 240.

In an illustrated example, assuming that element A 125 of FIG. 1 is an RNC, and element B 145 of FIG. 1 is a GGSN, a PDP context or UMTS bearer 260 between UE 110 and a GGSN 145 may comprise an RAB 265 between UE 110 and RNC 125 and a Direct Tunnel (Iu-u) bearer 270 between RNC 125 and GGSN 145 (the latter an example of a tunnel between elements A 125 and B 145). In this example, the GTP-U protocol may be relevant, for instance, for Iu-u bearer 270.

In an illustrated example, if core network 140 includes an SGSN, an SGW and a PG-W, there may be an S4 bearer 275 between the SGSN and PGW via SGW.

The subject matter is not limited to the examples illustrated and described above with reference to FIG. 2 and depending on the configuration of network 100, additional, fewer or different bearers may be relevant.

Any tunnel used for tunneling user data packets in accordance with GTP-U, such as a tunnel between element A 125 and element B 145, may be negotiated by way of signaling in the control plane, including provision of a tunnel identifier. (For simplicity's sake, the term "signaling" is used herein to refer to signaling in a control plane). The signaling may conform, to one or more signaling protocols such as GTP Version 1 Control (GTPv1-C), GTP Version 2 Control (GTPv2-C), Radio Access Network Application Part (RANAP), or S1 Application Protocol (S1-AP). The tunnel identifier may include, for instance, one or two GTP Tunnel Endpoint Identifier(s) (TEID(s)) (e.g. with each TEID comprising 32 bits), or any other appropriate tunnel identifier. Herein the term "TEID" refers to a GTP TEID. Therefore a user data packet may be tunneled by sending the user data packet at least encapsulated with a General Packet Radio System Tunneling Protocol User Plane (GTP-U) header which includes the tunnel identifier.

An example of a call flow during which a tunnel is negotiated will now be described for RANAP signaling in a UMTS network (with UTRAN Iu interface), in accordance with specification 3GPP TS 25.413 V10.3.0 (2011-09). The Iu interface may include the previously described Iu-u tunnel, the previously described IuPS tunnel, etc. Herein when referring to a tunnel, the terms "negotiate", "establish", set up", "create", and the like are used interchangeably.

In the call flow, the RNC may send an Initial UE Message to the SGSN. This message includes a Service Area Identifier SAI. The SAI may be used to identify a service area comprising one or more cells included in the same location area, and therefore may be used for identifying the location of the UE to the SGSN. The SAI may therefore be considered to be an example of a cell identifier which may be determined from this message.

The SGSN may then send a Common ID message to the RNC. This message includes the permanent Non-Access Stratum (NAS) UE Identity. The permanent NAS UE Identity may be used to identity UE 110 commonly in the UTRAN and in the core network. The NAS UE Identity may be considered to be an example of a user (also referred to as subscriber) identifier. Therefore a user identifier may be determined from this message.

The SGSN may then send a Security Mode Command message to the RNC. Subsequently the RNC may send a Security Mode Complete message to the SGSN. The RNC may then send a Direct Transfer message to the SGSN.

The SGSN may then send a RAB Assignment Request to the RNC. This message includes the Iu Transport Association and the RAB identifier (ID). The Iu Transport Association associates the RAB and the corresponding transport bearer. The Iu Transport Association includes the GTP TEID(s) and the Binding ID. The RAB ID is unique over one Iu connection as the RAB ID uniquely identifies a radio access bearer for a specific core network domain for a particular UE. The Iu Transport Association (and more specifically the TEID(s)) may be considered to be an example of a tunnel identifier. Therefore the RAB ID and a tunnel identifier may be determined from this message.

The RNC may then send an RAB Assignment Response Message. This message includes the RAB identifier and optionally an Iu Transport Association (which may include GTP TEID(s)). Therefore, the RAB ID, and optionally a tunnel identifier may be determined from this message.

The SGSN may then send a Direct Transfer Message to the RNC.

In order to release the Iu interface, the SGSN may send an Iu Release Command message to the RNC. The RNC may then send an Iu Release Complete message to the SGSN.

Herein when referring to a tunnel, the terms "release", "remove", delete", and the like are used interchangeably.

The disclosure is not limited by the call flow discussed above, and the call flow may vary depending on the example, based on the core network, radio access network, signaling, relevant specification(s), etc.

Typically although not necessarily a user data packet may be encapsulated with a GTP-U header, and a User Datagram Protocol (UDP)/Internet Protocol (IP) header when carried between GTP network nodes (e.g. between element A 125 and element B 145). Herein the term "outer IP packet" is used to refer to a user data packet plus GTP-U header plus UDP/IP header. Herein the term "G-PDU", "GTP encapsulated user plane data unit" or "PDU" is used to refer to the user data packet plus GTP-U header. For simplicity's sake, except when explicitly discussing IP address or UDP port, the description refers to a PDU rather than to an outer IP packet when describing an encapsulated user data packet. (In some examples herein, the term "data" may additionally or alternatively be used to refer to user data packet(s), PDU(s), or outer IP packet(s).)

The GTP-U header of a PDU is assumed to include a tunnel identifier, such as a TEID of the receiving element of the PDU. (It is noted that for a given IP address and UDP port of the receiving element there may be one or more tunnel endpoints). Consequently, if the association between the cell identifier (e.g. SAI) or user identifier (e.g. permanent NAS UE Identity), and the related tunnel identifier (e.g. including one or two TEID(s)) was determined (by system 130 or by another entity) from the signaling, then if the association is accessible to an entity which is configured to check for the association (e.g. system 130 or another entity), the association may be used by the entity configured to check for the association to recognize that the PDU is associated with a cell or user. However, without access to an association between a tunnel identifier and a cell identifier (e.g. SAI) or user identifier (e.g. permanent NAS UE Identity) an entity configured to check for the association may not be capable of recognizing the PDU as being associated with a cell or user, assuming the make-up of a PDU continues to exclude a cell identifier and user identifier as is currently the case.

Herein when referring to "another entity" or "the other entity", the usage of the single form should be understood to also cover examples where there is more than one other entity, if appropriate. In any example which includes another entity, the other entity may in that example be made up of any combination of software, hardware or firmware for performing function(s) attributed to the other entity in that example.

Figure 3:
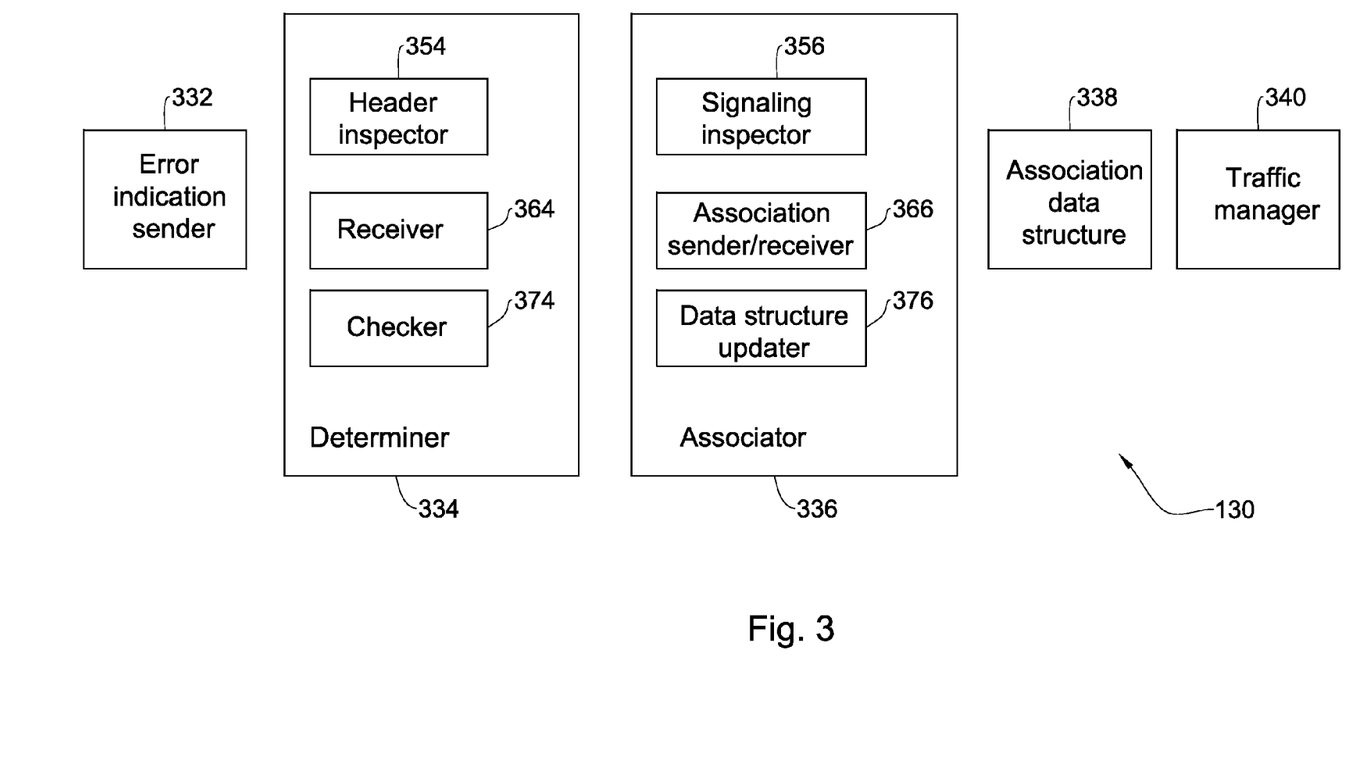
FIG. 3 is a block diagram of an example of a signaling event triggering system, in accordance with the presently disclosed subject matter.

FIG. 3 is a block diagram of an example of a signaling event triggering system 130, in accordance with the presently disclosed subject matter.

In the illustrated example, signaling event triggering system 130 includes the following modules: an error indication sender 332 configured to send an error indication in the data plane, and a determiner 334 configured to determine in accordance with a predefined criterion that an error indication should be sent and to notify sender 332 accordingly. Optionally signaling event triggering system 130 may also include any of the following modules: an associator 336 configured to determine an association between a tunnel identifier and a user identifier or cell identifier, an association data structure 338 configured to include associations between tunnel identifiers and user identifiers or cell identifiers, or a traffic manager 340 configured to perform traffic management tasks (e.g. traffic mapping, prioritizing, shaping or other traffic management related tasks). Optionally determiner 334 may include any of the following modules: header inspector 354 configured to inspect a GTP-U header (e.g. of a PDU being transmitted between element A 125 and element B 145) to determine a tunnel identifier, a receiver 364 configured to receive a tunnel identifier or an indication that an association between a tunnel identifier and a user identifier or cell identifier is not accessible (e.g. the indication may be a prepared error indication, command to send error indication, etc.), or a checker 374 configured to check for a tunnel identifier association (e.g. in association data structure 338). Optionally, associator 336 (if comprised in system 130) may include any of the following: a signaling inspector 356 configured to inspect signaling and to determine an association based on inspected signaling, an association sender/receiver 366 configured to send or receive an association, or a data structure updater 376 configured to update data structure 338 for an association. In any example of signaling event triggering system 130, signaling event triggering system 130 may be made up in that example of any combination of software, hardware or firmware which includes at least some hardware for performing functions attributed to system 130 in that example. Additionally, any module included in an example of system 130 may be made up in that example of any combination of software, hardware or firmware for performing function(s) attributed to that module in that example.

Depending on the example, for any association, association data structure 338 or any other association data structure may store both the cell identifier and user identifier, or may store only one of the two. For instance, in examples where it is only necessary to check for the existence of an association of a tunnel identifier with one of the two, or one may be derived from the other, then both may not necessarily be stored for a given association. Although not necessarily so, in some examples traffic management may rely upon a mapping of a tunnel to only a cell or to only a user, whereas in other examples traffic management may rely upon a mapping of a tunnel to either or both. In the former examples, it may be possible that if the mapping to a cell or user is not relied upon, it may not be necessary to check for the existence of an association with the identifier thereof (e.g. cell identifier, user identifier), and therefore that identifier may not necessarily be stored.

Figure 4:
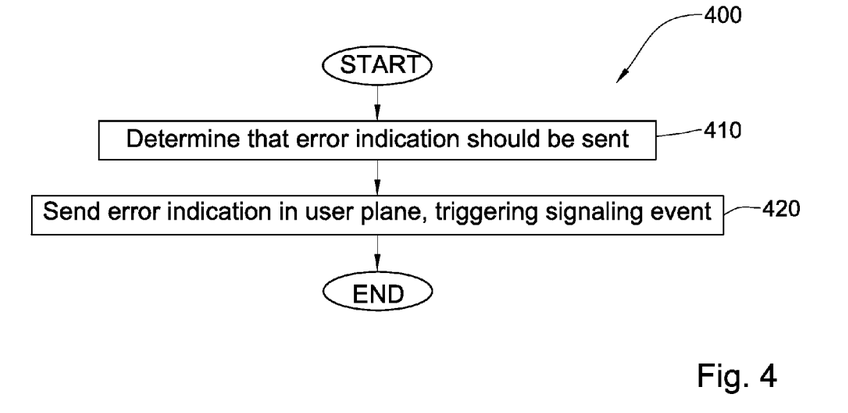
FIG. 4 is a flowchart of an example of a signaling event triggering method, in accordance with the presently disclosed subject matter.

FIG. 4 is a flowchart of an example of a signaling event triggering method 400, in accordance with the presently disclosed subject matter. In some examples, at least part of signaling event triggering method may be performed by signaling event triggering system 130.

In the illustrated example in stage 410, it may be determined (e.g. by determiner 334) that an error indication should be sent. The determination may be in accordance with a predefined criterion which may vary depending on the instance.

In some instances the predefined criterion may include no accessible association between a tunnel identifier and a user identifier or cell identifier for a given PDU. It is noted that if an association is not accessible to an entity configured to check for association (e.g. system 130 or another entity), then the entity may not recognize the PDU as being associated with a user or cell.

Depending on the instance where a predefined criterion includes no accessible association between a tunnel identifier and a user identifier or cell identifier for a given PDU, the lack of an accessible association may be the sole condition included in the predefined criterion or the predefined criterion may include additional condition(s) which the disclosure does not limit. For instance, an additional condition may stipulate that the tunnel whose tunnel identifier lacks an accessible association be characterized by one or more predetermined characteristics. For example, a predetermined characteristic may be that the tunnel whose tunnel identifier lacks an accessible association is consuming a significant amount of bandwidth.

Depending on the instance, it may be determined (e.g. by determiner 334) in various ways that an error indication should be sent in accordance with a predefined criterion which includes no accessible association. For instance, refer to FIG. 5 which is a flowchart of an example of a method of determining whether or not an error indication should be sent, in accordance with the presently disclosed subject matter. In the illustrated example, in stage 510 a GTP-U header of a PDU being transmitted (in either direction) between element A 125 and element B 145 may be inspected (e.g. by a header inspector such as header inspector 354). In the illustrated example, in stage 520 a tunnel identifier included in the GTP-U header may be determined (e.g. by a header inspector such as header inspector 354). For instance the tunnel identifier may identify a tunnel between element A 125 and element B 145, and may include for instance, one or two TEID(s). In the illustrated example, in stage 530 an association between the tunnel identifier and a user identifier or cell identifier may be checked for (e.g. by a checker such as checker 374). For instance, a checker may check an association data structure (e.g. association data structure 338) for an association. In the illustrated example, in stage 540, if the checked for association is accessible (e.g. accessible to a checker because it is accessible in a checked association data structure), then it may be determined in stage 550 of the illustrated example that an error indication should not be sent.

Figure 5:
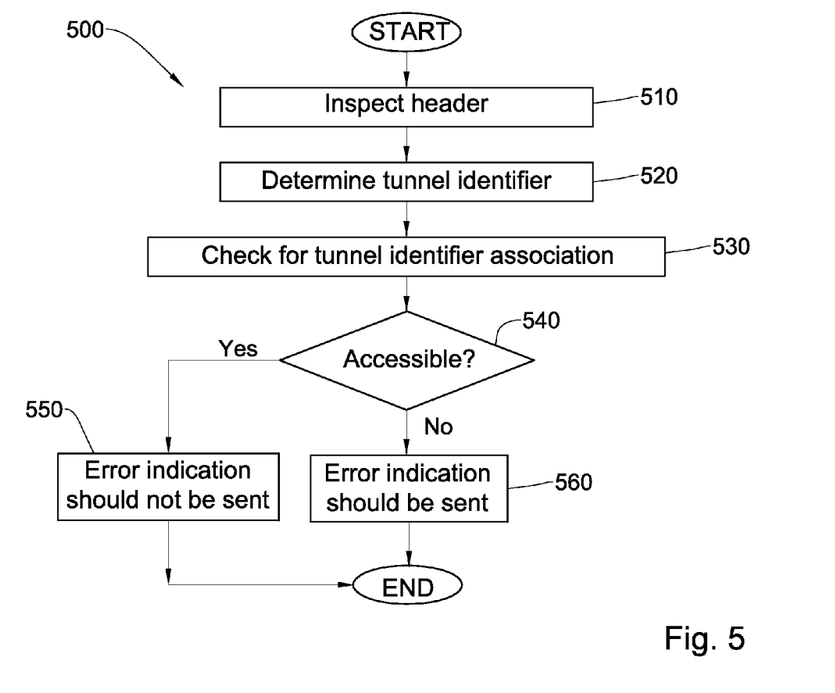
FIG. 5 is a flowchart of an example of a method of determining whether or not an error indication should be sent, in accordance with the presently disclosed subject matter.

Otherwise, if the checked for association of the tunnel identifier is not accessible (e.g. not accessible to a checker because it is not accessible in a checked association data structure), then it may be determined in stage 560 of the illustrated example that an error indication should be sent (or it may be determined that an error indication should be sent provided additional condition(s) included in the predefined criterion are met).

It is noted that in various instances, method 500 may be performed by system 130, by another entity, or partly by system 130 and partly by another entity. For simplicity's sake it is assumed in the instances described below that in accordance with the predefined criterion an error indication should be sent whenever there is no accessible association. For instance, system 130 (e.g. determiner 334) may be configured to perform all of the stages of method 400. In other instances, system 130 (e.g. determiner 334 or more specifically receiver 364) may additionally or alternatively be configured to receive an indication from another entity that the association is not accessible. For instance the other entity may have performed stages 510 to 530 and determined that an association is not accessible to a checker included in that entity. The form and content of the indication received from the other entity in these instances are not limited by the disclosure. The indication may include, for example, a prepared error indication (e.g. prepared by the other entity), a command to send an error indication, etc. In these instances, once the indication has been received from the other entity, system 130 (e.g. determiner 334) may be configured to perform stage 560 and determine that an error indication should be sent (because of an inaccessible association). (If a prepared error indication was received, the error indication which may be sent in stage 420 may be based on the received prepared error indication). In other instances, system 130 (e.g. determiner 334 or more specifically receiver 364) may additionally or alternatively be configured to receive a tunnel identifier from another entity. For instance, the other entity may have performed stages 510 and 520. In these instances, system 130 may be configured to perform stages 530 to 560. System 130 (e.g. determiner 334 or more specifically checker 374) may be configured to check association data structure 338 for an association between the tunnel identifier and a user identifier or cell identifier. If the association of the tunnel identifier is accessible (e.g. in data structure 338), then system 130 (e.g. determiner 334) may be configured to determine that an error indication should not be sent. If the association of the tunnel identifier is not accessible (e.g. not in data structure 338), then system 130 (e.g. determiner 334) may be configured to determine that an error indication should be sent. In other instances, system 130 (e.g. determiner 334 or more specifically header inspector 354) may additionally or alternatively be configured to perform stages 510 and 520, and provide the tunnel identifier to another entity which checks for an association in stage 530. In these instances, system 130 (e.g. determiner 334 or more specifically receiver 364) may be configured to receive an indication from the other entity indicating that the association is not accessible, if not accessible. Once the indication has been received from the other entity, system 130 (e.g. determiner 334) may be configured to perform stage 560 and determine that an error indication should be sent (because of an inaccessible association).

In other examples relating to stage 410, signaling event triggering system 130 (e.g. determiner 334) may additionally or alternatively be configured to determine that an error indication should be sent regardless of whether or not an association between a tunnel identifier and a user identifier or cell identifier may be accessible. In these examples, a predefined criterion in accordance with which it may be determined that an error indication should be sent may be any reason for which it is appropriate to trigger a signaling event. In these examples, system 130 may make the determination independently, or in conjunction with another entity, for instance, subsequent to an indication from the other entity. In cases where system 130 receives such an indication from another entity, the form and content of the indication are not limited by the disclosure. The indication may include, for instance, a reason to trigger signaling event, a command to send an error indication, a prepared error indication, etc.

Before returning to the description of FIG. 4, it is noted that a lack of an accessible association between a tunnel identifier and a user identifier or cell identifier may have negative implications in addition to or instead of possibly influencing a determination of whether an error indication should be sent. For instance for an entity configured to perform traffic management (e.g. system 130 or another entity), a lack of an accessible association may have negative implications for traffic management.

Referring back to FIG. 4, subsequently to a determination that an error indication should be sent, in the illustrated example, in stage 420, an error indication may be sent in the user plane from a location external to radio access network 120 and external to core network 140 to any of element A 125 or element B 145. For instance, error indication sender 332 may be external to radio access network 120 and core network 140 but operatively connected to at least element A 125 or element B 145 and may be configured to send an error indication to any of element A 125 or element B 145, responsive to a notification from determiner 334. The usage of the single form of error indication should be understood to include examples where a single error indication may be sent and examples where a plurality of error indications may be sent. Although not necessarily so, in some examples, a motivation for sending an error indication may include an attempt to positively affect traffic management. A positive impact on traffic management may occur in some examples as a consequence of the error indication as will be described below.

Conventionally, if element A 125 received a PDU from element B 145, or vice versa, which will be discarded by the receiving element for any appropriate reason, the receiving element A 125 or B 145 may send an error indication (in the data plane) to the sending element B 145 or A 125. For instance in accordance with some examples of GTP-U, a received PDU for which there is no EPS bearer context, PDP context, Multimedia Broadcast Multicast Service (MBMS) Bearer Context, or radio access bearer RAB, may be discarded and an error indication may be sent.

Although not necessarily so, in some instances of the presently disclosed subject matter, element A 125 or element B 145 may handle an error indication sent by system 130 as if sent by element B 145 or A 125 respectively. It is noted that an error indication sent in the data plane, for instance by system 130, may be stateless and therefore the error indication may have the same effect regardless of the state of the receiving element A 125 or B 145.

Although not necessarily so, in some instances of the presently disclosed subject matter an error indication sent in the data plane in stage 420 by system 130 (e.g. by error indication sender 332) may be formulated in accordance with a GTP-U protocol. For instance the error indication sent by system 130 in stage 420 may or may not include any of the following components conventionally found in a GTP-U error indication message in accordance with specification 3GPP TS 29.281 V11.4.0 (2012-09): GTP-U header (in this case with the TEID in the header set to all zeros), UDP/IP header, and Information Element(s) (IEs). IEs conventionally found in a GTP-U error indication message include: tunnel endpoint identifier data I (including TEID) which may be determined from a GTP-U header of a PDU (e.g. transmitted between element A 125 and element B 145) for which it is desired to send an error indication, and a GTP-U peer address which is the destination address (e.g. destination IP address, MBMS Bearer Context) for the error indication (e.g. equivalent to the address of the sending element A 125 or B 145 of the corresponding outer IP packet and determinable from the UDP/IP header). The error indication sent by system 130 in stage 420 may or may not include any of the following components conventionally optional in a GTP-U error indication message in accordance with specification 3GPP TS 29.281 V11.4.0 (2012-09): a GTP-U extension header comprising a UDP destination port (equivalent to the UDP port of sending element A 125 or B 145 of the corresponding outer IP packet and determinable from the UDP/IP header), and a private extension IE including for instance vendor or operator specific information. Depending on the instance, any of the above-mentioned components may be determined by system 130 (e.g. by header inspector 354 inspecting a GTP-U header or UDP/IP header) or may be determined and provided by another entity to system 130 (e.g. as part of a prepared error indication or separately) for usage in an error indication which will be sent by system 130. The TEID and the GTP-U peer address when included as IEs in an error indication sent by system 130 may together uniquely identify the related PDP context, RAB or EPS bearer in the receiving element.

In some instances where error indication sender 332 may be operatively connected to both element A 125 and element B 145, and PDUs (with tunnel identifier lacking accessible association) may flow in both directions (e.g. to element A 125 and B 145) system 130 may prefer to send an error indication in a certain direction (e.g. to either element A 125 or B 145) in order to trigger preferred action(s) and therefore system 130 may either prefer to relate to a PDU sent by a specific element (A 125 or B 145) or may otherwise enable the error indication to be sent to the specific element. In other instances, system 130 may not have a preference in which direction to send the error indication and may send an error indication in either direction without preference (e.g. to either element A 125 or B 145). In other instances system 130 may prefer to send an error indication in both directions, to both elements A 125 and B 145. In instances where system 130 is operatively connected to only element A 125 or to only element B 145, system 130 may send an error indication to the element to which system 130 is operatively connected, related to a PDU from that element. In instances where PDU(s) whose tunnel identifier lacks accessible association may flow in only one direction, system 130 may send an error indication to the sending element of the PDU(s).

The error indication which is sent by system 130 (e.g. by error indication sender 332) in stage 420 may be generated in various ways depending on the example. As mentioned above, determiner 334 may be configured to notify error indication sender 332 that an error indication should be sent. The disclosure does not limit the form and content of such a notification. For example, error indication sender 332 may be configured to receive a notification from determiner 334 that an error indication should be sent which includes a copy of an outer IP packet for which it is desired to send an error indication. Error indication sender 332 may be configured to then determine one or more component(s) for the error indication from the GTP-U header, UDP/IP header, etc. which may, for instance, provide or assist in providing a unique identification. The determined component(s) may, for instance, include component(s) selected from any of the following: component(s) conventionally included in an error indication such as tunnel endpoint identifier data I or GTP-U peer address, or component(s) conventionally optional for an error indication such as a UDP port or a private extension. In this example, the error indication which may be generated by error indication sender 332 and sent in stage 420 may include any of the component(s) determined by error indication sender 332.

Additionally or alternatively the notification received by error indication sender 332 from determiner 334 may include certain component(s), or may include a prepared error indication which includes certain component(s). (As explained above a prepared error indication may have been previously received by determiner 334). These certain component(s) may for instance, provide or assist in providing a unique identification. The certain component(s) may, for instance, include component(s) selected from any of the following: component(s) conventionally included in an error indication such as tunnel endpoint identifier data I or GTP-U peer address, or component(s) conventionally optional for an error indication such as a UDP port or a private extension. In these examples, the error indication sent by error indication sender 332 in stage 420 may include certain component(s) which were included in the notification (as part of or not as part of a prepared error indication), in addition to or instead of component(s) determined by error indication sender 332. Depending on the example, for any error indication sent by error indication sender 332 in stage 420, error indication sender 332 may generate and send the error indication, or may send as the error indication a prepared error indication which was previously received from determiner 334.

The error indication sent by system 130 (e.g. error indication sender 332) in stage 420 may trigger a signaling event in a control plane. The disclosure does not limit the triggered signaling event and therefore the signaling event that may be triggered may be any appropriate signaling event in a control plane. For simplicity of description regardless of the complexity of the triggered signaling, the triggered signaling will be referred to herein as a single event per example.

The triggered signaling event may or may not include release of a tunnel (e.g. existing tunnel between element A 125 and B 145, corresponding RAB or E-RAB, corresponding core network bearer, etc) or negotiation of a tunnel (e.g. new tunnel between element A 125 and B 145, new corresponding RAB or E-RAB, new corresponding core network bearer, etc). In instances where the signaling event includes certain information (e.g. tunnel identifier, user identifier, cell identifier, other information etc.), inspection of the signaling may enable determination of the association between a tunnel identifier and a user identifier or cell identifier, or other information. In order for the reader to better understand these instances, a general explanation regarding inspection of signaling in accordance with some examples of the subject matter will first be discussed.

Figure 6:
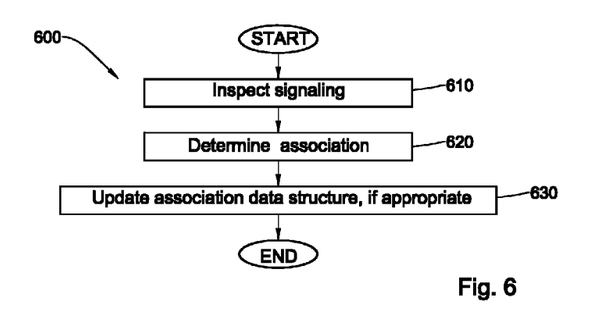
FIG. 6 is a flowchart of an example of a method of updating an association data structure, in accordance with the presently disclosed subject matter.

Refer to FIG. 6 which is a flowchart of an example of a method 600 of updating an association data structure, in accordance with the presently disclosed subject matter. In the illustrated example, in stage 610 signaling may be inspected (e.g. by a signaling inspector such as signaling inspector 356). In the illustrated example, in stage 620, an association between a tunnel identifier and a cell identifier or user identifier may be determined based on the inspected signaling (e.g. by a signaling inspector such as signaling inspector 356). For instance, the tunnel identifier may identify a tunnel for tunneling user data packets between element A 125 and element B 145. Optionally, other information relating a tunnel (e.g. between element A 125 and element B 145) may be determined (e.g. identifier of RAB/E-RAB or identifier of core network tunnel corresponding to a tunnel between element A 125 and element B 145) in addition to the determined association. In the illustrated example, in stage 630, an association data structure such as association data structure 338 may be updated (e.g. by a data structure updater such as data structure updater 376) if appropriate. The association data structure may be updated, if appropriate in light of the determined association or other determined information. For instance, updating may be considered appropriate for a new tunnel (e.g. new tunnel between element A 125 and element B 145) in order to add the association (e.g. tunnel identifier, user identifier, or cell identifier) and optionally other information (e.g. identifier of RAB/E-RAB or identifier of core network tunnel corresponding to tunnel between element A 125 and element B 145) to the association data structure. For instance, updating may be considered appropriate for a released tunnel (e.g. released tunnel between element A 125 and element B 145) in order to remove the association (e.g. tunnel identifier, user identifier, or cell identifier) and optionally other information (e.g. identifier of RAB/E-RAB or identifier of core network tunnel corresponding to tunnel between element A 125 and element B 145) from the association data structure or in order to mark the association and optionally other information as non-current. For instance, updating may be considered appropriate if the association (e.g. tunnel identifier, user identifier or cell identifier) relating to an existing tunnel (e.g. existing tunnel between element A 125 and element B 145) or (optionally) other information (e.g. RAB/E-RAB identifier or core network tunnel identifier corresponding to tunnel between element A 125 and element B 145) has been changed in order to update the association data structure for the change. Alternatively, for instance, updating may only be considered appropriate for a new tunnel whereas tunnel release or a change in the association or other information relating to an existing tunnel may be ignored.

It is noted that in various instances, method 600 may be performed by system 130, by another entity, or partly by system 130 and partly by another entity. For instance, system 130 (e.g. associator 336) may be configured to perform all of the stages of method 600. In other instances, system 130 (e.g. associator 336 or more specifically association sender/receiver 376) may additionally or alternatively be configured to receive an association (e.g. tunnel identifier, user identifier or cell identifier) or other information from another entity. For instance the other entity may have performed stages 610 to 620 and determined the association or other information. After receiving the association or other information from the other entity system 130 (e.g. associator 336 or more specifically data structure updater 376) may be configured to perform stage 630 if updating is appropriate. In other instances, system 130 (e.g. associator 336 or more specifically signaling inspector 356) may additionally or alternatively be configured to perform stages 610 and 620, and system 130 (e.g. associator 336 or more specifically association sender/receiver 376) may be configured to send the association or other information to another entity which may use the sent association or other information to perform one or more tasks such as updating an association data structure in stage 630 (in addition to or instead of system 130 updating an association data structure in stage 630) or traffic management such as traffic mapping, prioritizing, shaping or other traffic management tasks (in addition to or instead of system 130 performing traffic management).

Depending on the instance, there may or may not be advantages to having a signaling event triggered by the error indication sent by system 130. For instance, assume a predefined criterion for determining to send an error indication includes no accessible association between a tunnel identifier and a user identifier or cell identifier, solely, or in addition to other condition(s) (e.g. the tunnel with that tunnel identifier being characterized by predetermined characteristic(s)). A lack of an accessible association between a tunnel identifier and a cell identifier or user identifier may have negative implications for traffic management because the lack of an accessible association may prevent data from being mapped to the corresponding cell or user. Therefore, if a triggered signaling event includes the release of a tunnel corresponding to the unmapped data (e.g. between element A 125 and element B 145), traffic management may be positively affected. Additionally or alternatively, if the triggered signaling event includes the establishment of a tunnel (e.g. between element A 125 and element B 145), whereby the association between the tunnel identifier and a cell identifier or user identifier may be determined (e.g. by way of method 600), traffic management may be positively affected because the data corresponding to the established tunnel may be mapped to the identified cell or user. Depending on the instance, system 130 may or may not perform traffic mapping, prioritizing, shaping or other traffic management related tasks (e.g. as a result of a signaling event triggered by the error indication). For instance, in some examples, traffic manager 340 of system 130 may be configured to perform traffic management related tasks, whereas in other examples no traffic management may be performed by traffic manager 340. Depending on the example, traffic management may or may not be performed by another entity, in addition to or instead of being performed by traffic manager 340.

Some examples will now be discussed of possible action(s) performed by any receiving element B 145 or A 125, upon receipt of an error indication sent by system 130 in stage 420. (These action(s) may therefore be considered to have been triggered due to the error indication sent in the user plane). These action(s) may be action(s) prescribed to be performed upon receipt of an error indication by element B 145 from element A 125 or by element A 125 from element B 145, for instance as described in specification 3GPP TS 23.007 V11.3.0 (2012-09), even though the error indication was sent by system 130 and not by element A 125 or B 145. As will be noted in the various examples below, the prescribed action(s) may include a signaling event (and therefore the included signaling event may be considered to have been triggered due to the error indication).

In accordance with some examples of the presently disclosed subject matter with respect to GTP-U where element B 145 is an SGSN and element A 125 is an RNC, and element B 145 receives a GTP error indication from system 130 (relating to a tunnel between element B 145 and element A 125), element B 145 may locally release the RAB but preserve the associated bearer context. Element B 145 may then initiate a signaling event including the RAB Assignment Procedure, for instance as described in specification 3GPP TS 25.413 V10.3.0 (2011-09) (related to RANAP), in order to negotiate a RAB, and including establishment of a Signaling Connection Control Part (SCCP) connection. It is noted that the SCCP of the Signaling System No. 7 (SS7) protocol provides the transport layer for air interface protocols such as RANAP. Therefore, before the RAB assignment procedure or any other RANAP procedures may take place, an SCCP connection may be established. The RAB assignment Procedure may include element B 145 sending a RAB Assignment Request message to element A 125 and element A 125 responding with a RAB assignment response. The RAB Assignment Request Message includes the Iu Transport Association and the RAB ID. The RAB assignment response message includes the RAB ID and optionally the Iu Transport Association. The Iu Transport Association associates the RAB and the corresponding transport bearer. The Iu Transport Association includes the GTP TEID(s) and the Binding ID. A RAB ID is unique over one Iu connection as the RAB ID uniquely identifies a radio access bearer for a specific core network domain for a particular UE. Optionally there may be additional RANAP procedure(s) carried over the same SCCP connection which may include identification of a cell or user. Therefore, inspection of the signaling may enable determination of information for a tunnel newly negotiated between element A 125 and element 145 (e.g. association between tunnel identifier, such as TEID(s), and a user identifier or cell identifier, or other information such as the RAB ID). Optionally, an association data structure (e.g. association data structure 338) may be updated for determined information (e.g. for the association or other information). Optionally traffic management may be positively affected by the determination of the information.

Additionally or alternatively in another instance, in accordance with some examples of the presently disclosed subject matter with respect to GTP-U element A 125 may be an RNC or NodeB, and element B 145 may be an SGSN, SG-W or GGSN. For simplicity's sake it is assumed that element A 125 is an RNC but similar action(s) may take place if element A 125 is a NodeB, mutatis mutandis. When element A 125 receives a GTP error indication from system 130 (relating to a tunnel between element A 125 and element B 145), element A 125 may initiate a signaling event including the RAB Release Procedure with the error cause "GTP resources unavailable", and may locally release the RAB without waiting for a response from an SGSN. In the RAB release procedure, for instance as described in specification 3GPP TS 23.060 V6.11.0 (2005-12), element A 125 may send a RAB release request to the SGSN, including the RAB ID, and the cause which in this instance would be "GTP resources unavailable". The SGSN may then send to element A 125 a RAB Assignment Request Message including the RAB ID and the cause. The RAB may then be released, if existing. Element A 125 may then send a RAB assignment response including the RAB ID, the GTP SND and the GTP SNU to the SGSN. The GTP-SND is the sequence number of the next downlink (network) PDU to be sent to the UE. The GTP-SNU is the sequence number of the next uplink (network) PDU to be sent to the Gateway GPRS Support Node (GGSN). Therefore the GTP SND and GTP SNU may enable the SGSN to restore the values in case the PDP context is maintained and the RAB is re-established at a later stage. Inspection of the signaling may therefore enable determination of the RAB ID. Optionally, the determination may enable removal of information relating to the RAB (e.g. association of identifier of corresponding tunnel between element A 125 and element B 145 with a cell identifier or a user identifier, or other information such as the RAB ID) from an association data structure (e.g. association data structure 338). Optionally the release of the RAB may enable release of the corresponding tunnel between element A 125 and element B 145 (whose data is not being mapped to a user or cell), which may positively affect traffic management.

Additionally or alternatively in another instance, in accordance with some examples of the presently disclosed subject matter with respect to GTP-U where element A 125 is an eNodeB and element B 145 is an SGW, and element A 125 receives a GTP error indication from system 130 relating to an S1-U tunnel not doing indirect forwarding, element A 125 may initiate a signaling event such as the E-RAB Release Procedure and locally release the E-RAB without waiting for a response from an MME. In the E-RAB release procedure, for instance as described in specification 3GPP TS 36.413 V10.3.0 (2011-09), element A 125 may send an E-RAB Release Indication to the MME, including the E-RAB released at element A 125. The MME may then normally initiate the appropriate release procedure on the side of core network 140 for the E-RAB identified in the E-RAB release Indication. Inspection of the signaling may therefore enable determination of the E-RAB. Optionally, the determination may enable removal of information relating to the E-RAB (e.g. association of identifier of corresponding tunnel between element A 125 and element B 145 with a cell identifier or a user identifier, or other information such as the E-RAB identifier) from an association data structure (e.g. association data structure 338). Optionally the release of the E-RAB may enable release of the corresponding tunnel between element A 125 and element B 145, (whose data is not being mapped to a user or cell) which may positively affect traffic management.

Additionally or alternatively in another instance, in accordance with some examples of GTP-U where element A 125 is an RNC and element B 145 is a GGSN, and element B 145 receives a GTP error indication from system 130 for a Bearer Context that has the Direct Tunnel Indicator (DTI) flag set, element B 145 may not delete the associated PDP context but may mark the PDP context as invalid. Any subsequent packets arriving for an invalid PDP context may be discarded. A triggered signaling event may include element B 145 informing the SGSN that element B 145 received a GTP error indication (e.g. in an Update PDP Context Request) and the SGSN re-establishing a tunnel between the SGSN and element B 145 (e.g. as specified in specification 3GPP TS 29.060 V11.4.0 (2012-09)) which sets the related PDP context as valid again in element B 145. Element B 145 may then forward any subsequent downlink packets to the SGSN. Inspection of the signaling may therefore enable determination of information relating to a core network tunnel between SGSN and element B 145. Optionally an association data structure (e.g. association data structure 338) may be updated for information relating to the core network tunnel (e.g. association of identifier of corresponding tunnel between element A 125 and element B 145 with cell identifier or user identifier, or other information such as a core network identifier). Optionally traffic management may be positively affected by the determined information.

Additionally or alternatively in another instance, in accordance with some examples of the presently disclosed subject matter with respect to GTP-U where element A 125 is an RNC, element B 145 is an SGW, and UE 110 is active, and element B 145 receives a GTP error indication from system 130 for a Bearer Context that has the Direct Tunnel Indicator (DTI) flag set (in this example the direct tunnel is between element A 125 being an RNC and element B 145 being an SGW), element B 145 may not delete the associated Bearer Context but may delete all the RNC GTP-U tunnel TEIDs for UE 110 and initiate a signaling event including sending a Downlink Data Notification message to an SGSN. Element B 145 may then start buffering downlink packets received for this UE 110.

Additionally or alternatively, in another instance, in accordance with some examples of GTP-U where element A 125 is an eNodeB, element B 145 is an SGW, and UE 110 is active, and element B 145 receives a GTP error indication from system 130 for a Bearer Context, element B 145 may not delete the associated Bearer Context but may delete all the eNodeB GTP-U tunnel TEIDs for UE 110 and initiate a signaling event including sending a Downlink Data Notification message to an MME. Element B 145 may then start buffering downlink packets received for this UE 110.

With regard to a Downlink Data Notification message mentioned above, if the MME or SGSN receives a downlink data notification message from element B 145 (in this example the SGW) as a result of element B 145 having received an error indication message from system 130, then depending on the example the signaling event which includes a Downlink Data Notification message may or may not include removal of a tunnel or a negotiation of a new tunnel. The removal of a tunnel or negotiation of a new tunnel may optionally positively affect traffic management.

Alternatively to the example shown in FIG. 3, system 130 may in some examples include fewer, more or different modules than shown in FIG. 3. For instance in some examples, error indication sender 332 and determiner 334 may be combined into fewer module(s) than shown in FIG. 3. For instance, in some examples where system 130 includes header inspection and signaling inspection functionality, modules 354 and 356 may be combined. For instance, in some examples where system 130 includes functionality described above with respect to receiver module 364 and with respect to association sender/receiver module 366, modules 364 and 366 may be combined. For instance, in some examples where system 130 includes association sender functionality and association receiver functionality, association sender/receiver 366 may be separated into modules with sender and receiver functionality respectively.

Alternatively to the example shown in FIG. 3, the functionality of system 130 may in some examples be divided differently among the modules illustrated in FIG. 3. Alternatively to the example shown in FIG. 3, the functionality of system 130 described herein may in some examples be divided into fewer, more or different modules than shown in FIG. 3. Alternatively to the example shown in FIG. 3, system 130 may in some examples include additional, less, or different functionality than described herein.

Depending on the example, system 130 may be centralized in one location (e.g. including one or more units at that location), or system 130 may be dispersed over more than one location in mobile network 100.

Depending on the example, at least part of signaling event triggering system 130 may or may not be in a location where data transmitted between element A 125 and element B 145 may be accessed. For instance in some examples where system 130 includes header inspector 354 at least header inspector 354 may be in a location where header inspector 354 may access the data, but in other examples system 130 may not be in a location where data transmitted between element A 125 and element B 145 may be accessed. In these latter examples, system 130 may not include header inspector 354, or system 130 may include header inspector 354 that may in these examples be configured to receive a copy of transmitted data, or a part thereof, from another entity (which may be in a location accessible to the data) for inspection.

Depending on the example, at least part of signaling event triggering system 130 may or may not be in a location where signaling between radio access network 120 and core network 140 (relating to a tunnel between elements A 125 and B 145) may be accessed. It is noted that a location where signaling between radio access network 120 and core network 140 may be accessed may not necessarily be a location where data between radio access network 120 and core network 140 may be accessed. For instance in an LTE architecture, the positioning of at least part of system 130 between eNodeB and MME may allow access to signaling between radio access network 120 and core network 140 by system 130, whereas the positioning of at least part of system 130 between eNodeB and SGW may allow access to data between radio access network 120 and core network 140 by system 130. In some cases where system 130 includes signaling inspector 356, at least a part of signaling inspector 356 may be in a location for accessing the signaling between radio access network 120 and core network 140. However, in other cases system 130 may not be in a location where signaling between radio access network 120 and core network 140 (relating to a tunnel between elements A 125 and B 145) may be accessed. In these latter cases, if system 130 nevertheless includes a signaling inspector 356 which may be configured to inspect signaling between radio access network 120 and core network 140, signaling inspector 356 may be configured to receive a copy of the signaling, or a part thereof, from another entity (which may be in a location accessible to the signaling) for inspection. Alternatively, system 130 may not include a signaling inspector 356 which is configured to inspect signaling between radio access network 120 and core network 140.

Depending on the example, at least part of signaling event triggering system 130 may or may not be in a location where signaling relating to a RAB, E-RAB, or a core network tunnel corresponding to a tunnel between elements A 125 and B 145 may be accessed. For example, in some cases where system 130 includes signaling inspector 356 at least a part of signaling inspector 356 may be in a location for accessing the signaling between UE 110 and radio access network 120, or within core network 140. However, in other cases system 130 may not be in a location for accessing signaling relating to a corresponding RAB/E-RAB, or relating to a corresponding core network tunnel. In these latter cases, if system 130 nevertheless includes a signaling inspector 356 which may be configured to inspect such signaling, signaling inspector 356 may be configured to receive a copy of such signaling, or a part thereof, from another entity (which is in a location accessible to the signaling) for inspection. Alternatively, system 130 may not include a signaling inspector 356 which is configured to inspect such signaling. It is noted that it is possible that in some examples signaling relating to a RAB, E-RAB, or core network tunnel corresponding to a tunnel between elements A 125 and B 145 may not be inspected for a purpose in accordance with the presently disclosed subject matter, and therefore no part of system 130, nor of the other entity may necessarily be in a location accessible to such signaling.

Depending on the example, all of system 130 may or may not be external to radio access network 120 and core network 140. For instance, in some examples a part of system 130 may be located in any of radio access network 120 or core network 140.

Depending on the example, system 130 may be a standalone system or may be part of another (integrated) system which has additional functionality. For instance, in some examples system 130 may be integrated with another entity and functions attributed herein to system 130 or to the other entity (if any), may be performed by the integrated system. Possibly, in some of these examples the other entity which may be integrated with system 130 may include one or more elements e.g. a bandwidth manager or a part thereof, backhaul aggregation router or switch, optical bypass switch or network tap such as described in co-pending application, US publication No. 2012/0087260 titled Modeling Radio Access Networks, to Devarapalli et al, which is hereby incorporated by reference herein. In these examples, consequently, the integrated system may include one or more of the elements included in the other entity. Such an integrated system which may include one or more of these elements may not necessarily be configured to perform all functions described in US publication No. 2012/0087260. Therefore reference herein to signaling event triggering system 130 or to any signaling event triggering system should be understood to cover examples where the system is a standalone system, examples where there is an integrated system which includes the system, etc. as appropriate.

Alternatively to any of the examples illustrated in any of the method flowcharts (FIGS. 4, 5, 6) described above, stages which are shown in as being executed sequentially may in some other examples be executed in parallel, or stages shown as being executed in parallel may in some other examples be executed sequentially. Alternatively to any of the examples illustrated in any of the method flowcharts described above, any of the methods may in some other examples include more, fewer or different stages than illustrated in the corresponding flowchart. Alternatively to any of the examples illustrated in any of the method flowcharts described above, stages may in some other examples be executed in a different order than illustrated in the corresponding flowchart.

Figure 7:
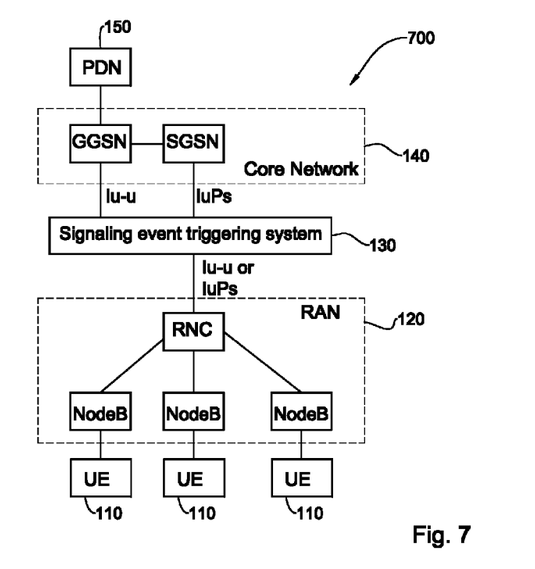
FIG. 7 is a block diagram of an example of a mobile network with a core network of Universal Mobile Telecommunications System architecture, in accordance with the presently disclosed subject matter.
Figure 8:
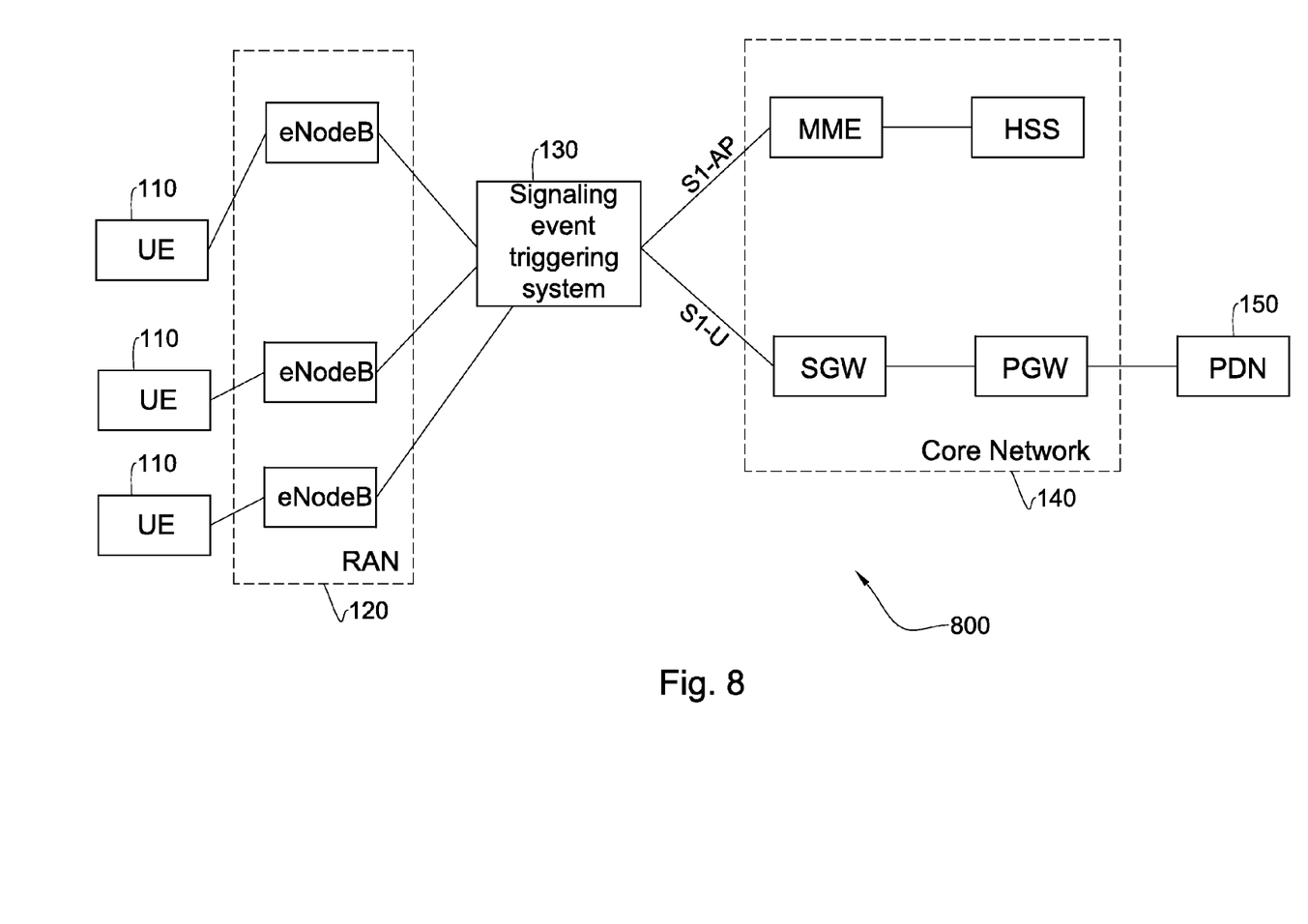
FIG. 8 is a block diagram of an example of a mobile network with a core network of Long Term Evolution architecture, in accordance with the presently disclosed subject matter.

Although the subject matter does not impose limitations on the type of radio access network 120, type of core network 140, location of system 130 or concentration of system 130, for the sake of further illustration FIGS. 7 and 8, show some examples of architecture where system 130 may be concentrated in a location where signaling and data between radio access network 120 and core network 140 may be accessed.

FIG. 7 is a block diagram of an example of a mobile network 700 with a core network of UMTS architecture, in accordance with the presently disclosed subject matter.

Network 700 is an example of network 100 discussed above.

In the illustrated example, network 700 includes user equipments 110, radio access network 120 (which in this example is a universal radio access network (UTRAN) and element A 125 is an RNC), core network 140 (where in this example element B 145 is an SGSN or GGSN), and PDN 150. In this example, radio access network 120 also includes NodeBs controlled by the RNC. For simplicity of illustration only three UEs 110 and three NodeBs are shown in FIG. 7. In this example system 130 is located between radio access network 120 and core network 140. The exact distance between system 130 and radio access network 120 or core network 140 may vary depending on the instance.

FIG. 8 is a block diagram of an example of a mobile network 800 with a core network of LTE architecture, in accordance with the presently disclosed subject matter.

Network 800 is an example of network 100 discussed above.

In the illustrated example, network 800 includes user equipments 110, radio access network 120 (which in this example is an Evolved Universal Radio Access Network (E-UTRAN) 120 and element A 125 is an eNodeB), core network 140 (where in this example element B 145 is an SGW), and PDN 150. For simplicity of illustration only three UEs 110 and three eNodeBs are shown in FIG. 8. In this example system 130 is located between radio access network 120 and core network 140. The exact distance between system 130 and radio access network 120 or core network 140 may vary depending on the instance.

It will be understood that the subject matter contemplates that a signaling event triggering system such as signaling event triggering system 130, or a part thereof, may, for example, be a computer specially constructed for the desired purposes, or specially configured for the desired purpose by computer readable program code embodied in a computer readable medium. The subject matter further contemplates, for example a computer program being readable by a computer for executing a method or part of a method disclosed herein. Further contemplated by the subject matter, for example, is a computer-readable memory tangibly embodying program code readable by a computer for executing a method or part of a method disclosed herein.

While examples of the subject matter have been shown and described, the subject matter is not thus limited. Numerous modifications, changes and improvements within the scope of the subject matter will now occur to the reader.

The invention claimed is:

1. A signaling event triggering system, comprising:
   an association data structure matching tunnel identifiers of monitored transmissions and respective user or cell identifiers;
   a determiner configured to monitor transmissions passing in tunnels between a first element in a radio access network and a second element in a core network of a mobile network, from an intermediary point between the first and second elements, to determine a tunnel identifier of the transmissions from the monitored transmissions, and to search the association data structure for a user or cell identifier corresponding to the tunnel identifier determined from the monitored transmissions; and
   an error indication sender, external to the radio access network and to the core network of the mobile network, the sender configured, responsive to a determination that the corresponding user or cell identifier is not available in the association data structure, to send an error indication in a user plane of the mobile network from the intermediary point, between the first element in the radio access network and the second element in the core network, to at least one of the first and second elements, wherein the error indication triggers the first or second element that receives the error indication to initiate a signaling event in a control plane of the mobile network, wherein the error indication is handled by the first or second element receiving the error indication as if the error indication was transmitted by the second or first element, respectively.

2. The system of claim 1 wherein said determiner includes:
   a header inspector configured to inspect a General Packet Radio System Tunneling Protocol User Plane header to determine the tunnel identifier.

3. The system of claim 2, wherein said tunnel identifier includes at least one General Packet Radio System Protocol Tunnel Endpoint Identifier.

4. The system of claim 1, wherein said error indication is formulated in accordance with a General Packet Radio System Tunneling Protocol User Plane.

5. The system of claim 1, wherein said error indication includes a tunnel identifier.

6. The system of claim 1, wherein said signaling event includes release of a tunnel.

7. The system of claim 1, wherein said signaling event includes establishment of a tunnel.

8. The system of claim 1, further comprising: a signaling inspector configured to inspect signaling, to determine based on said inspected signaling, an association between a tunnel identifier and a cell identifier or user identifier, and to store the determined association in the association data structure.

9. The system of claim 1, wherein at least one of the at least one operatively connected element is selected from a group comprising: Radio Network Controller, Serving General Packet Radio Service Node, Gateway General Packet Radio Service Support Node, eNodeB, NodeB, Base Station Controller, and Serving Gateway.

10. The system of claim 1, wherein the system is integrated with a network tap.

11. The system of claim 1, wherein the error indication sender is configured to send the error indication, only if an additional condition is met, in addition to the determination that the corresponding user or cell identifier is not available in the association data structure.

12. The system of claim 1, wherein the additional condition comprises that the tunnel whose tunnel identifier lacks an accessible association is consuming a significant amount of bandwidth.

13. A method, comprising:
monitoring transmissions passing in tunnels between a first element in a radio access network and a second element in a core network of a mobile network, by a signaling unit at an intermediary point between the first and second elements;
determining a tunnel identifier of the transmissions between the first and second elements from the monitored transmissions;
searching an association data structure for a user or cell identifier corresponding to the tunnel identifier determined from the monitored transmissions;
determining that the corresponding user or cell identifier is not available in the association data structure; and
sending, by the signaling unit, an error indication in a user plane of the mobile network from the intermediary point between the first element in the radio access network and the second element in the core network, to the first or second element, responsively to determining that the corresponding user or cell identifier is not available, wherein the error indication triggers the first or second element receiving the error indication to initiate a signaling event in a control plane of the mobile network,
wherein the error indication is identified by the first or second element receiving the error indication as being sent by the second or first element, respectively.

14. The method of claim 13, wherein said determining the transmission identifier of the transmissions, includes:
inspecting a General Packet Radio System Tunneling Protocol User Plane header to determine the tunnel identifier.

15. The method of claim 13, wherein said signaling event includes release of a tunnel.

16. The method of claim 13, further comprising:
inspecting signaling; and
determining based on said inspected signaling, an association between a tunnel identifier and a cell identifier or user identifier.

17. The method of claim 13, wherein said error indication is formulated in accordance with a General Packet Radio System Tunneling Protocol User Plane.

18. A computer program product comprising a non-transitory computer readable medium having computer readable program code embodied therein, the computer program code, when executed by a computer executes a method, comprising:
monitoring transmissions passing in tunnels between a first element in a radio access network and a second element in a core network of a mobile network, by a unit at an intermediary point between the first and second elements, to determine a tunnel identifier of the transmissions from the monitored transmissions, to search an association data structure for a user or cell identifier corresponding to the tunnel identifier determined from the monitored transmissions and to determine that the corresponding user or cell identifier is not available in the association data structure; and
sending an error indication in a user plane of the mobile network from the intermediary point between the first element in the radio access network and the second element in the core network, to the first or second element in said radio access network or said core network, responsively to determining that the corresponding user or cell identifier is not available, wherein the error indication triggers the first or second element receiving the error indication to initiate a signaling event in a control plane of the mobile network,
wherein the error indication is identified by the first or second element receiving the error indication as being sent by the second or first element, respectively.

19. The computer program product of claim 18, wherein said computer readable code for causing the computer to determine the transmission identifier of the transmissions includes:
computer readable program code for causing the computer to inspect a General Packet Radio System Tunneling Protocol User Plane header to determine the tunnel identifier.

20. The computer program product of claim 18, wherein said signaling event includes release of a tunnel.

21. The computer program product of claim 18, further comprising:
computer readable program code for causing the computer to inspect signaling; and
computer readable program code for causing the computer to determine based on said inspected signaling, an association between a tunnel identifier and a cell identifier or user identifier.

22. The computer program product of claim 18, wherein said error indication is formulated in accordance with a General Packet Radio System Tunneling Protocol User Plane.

* * * * *